Patented June 10, 1952

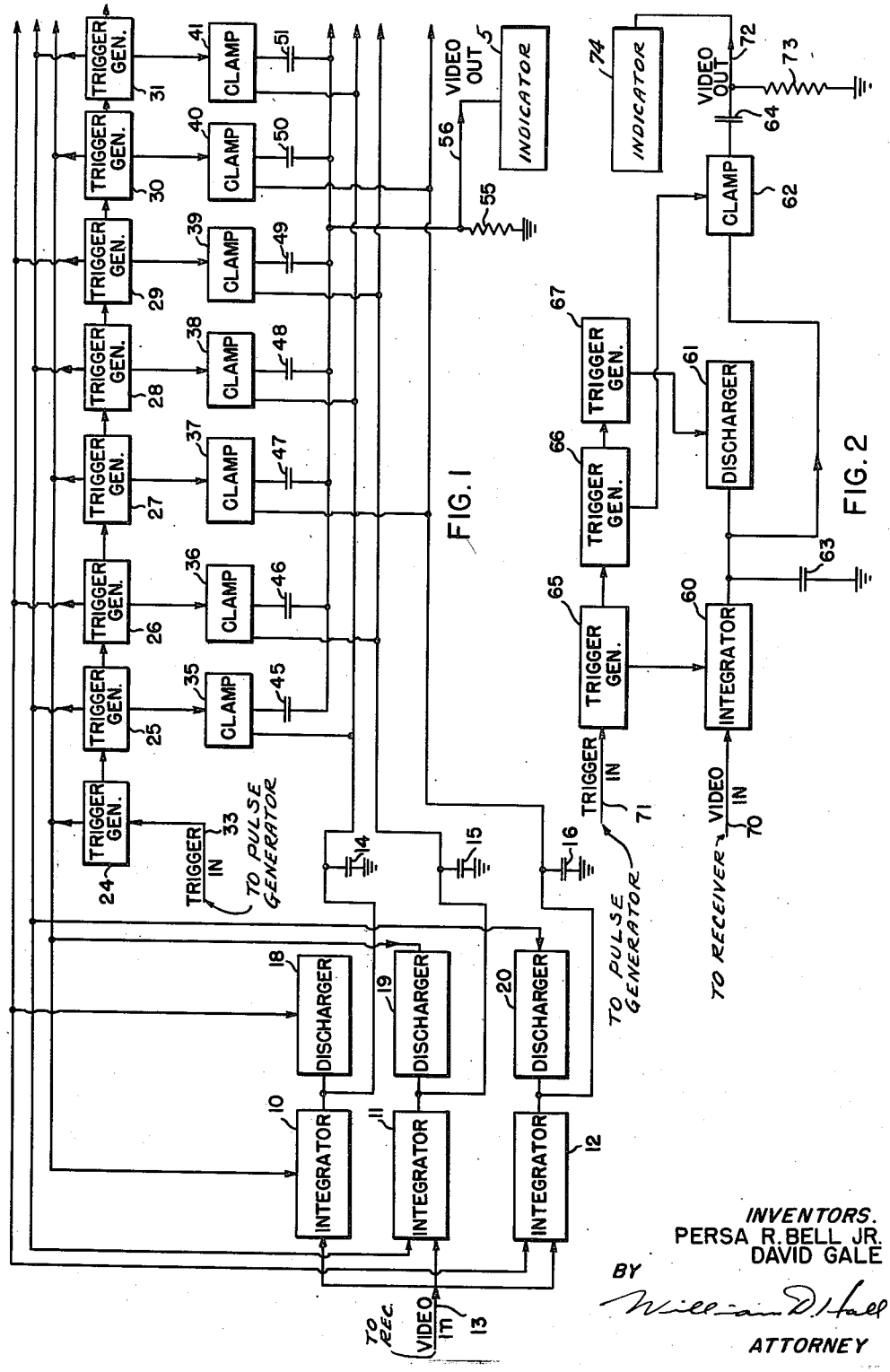

2,600,193

UNITED STATES PATENT OFFICE 2,600,193

COMPARATOR CIRCUIT FOR MOVING TARGET INDICATION RADAR SYSTEMS

Persa R. Bell, Jr., Oak Ridge, Tenn., and David Gale, New York, N. Y., assignors, by mesne assignments, to United States of America as represented by the Secretary of War Application April 30, 1946, Serial No. 666,026

8 Claims. (Cl. 343—9)

This invention relates to electrical circuits and more particularly to circuits for use in connection with radio object locating systems to indicate the presence of moving objects.

Radar or radio object locating systems are employed to locate the position in space of objects surrounding the system antenna. The location of these objects is accomplished by radiating short duration high frequency exploratory pulses from a directional antenna and receiving object returned echoes with the same or a similar antenna. The time interval between the time an exploratory pulse is transmitted and the time an object returned echo is received is proportional to the range to the object returning the echo. The azimuth and elevation of the axis of the antennas at the time the echoes are received is substantially equal to the azimuth and elevation of the object from the system antenna since the antenna is highly directional.

It is sometimes desirable to eliminate signals from fixed objects and present on the system indicator only that data relating to moving objects. This is done to remove ground clutter from the indicator and to eliminate any fixed signals that might obscure signals from moving objects such as aircraft, ships, land vehicles, etc.

To eliminate signals resulting from fixed objects all received echo signals are mixed or additively combined with a reference oscillation that has a fixed phase with respect to the transmitted exploratory pulses. Echo signals from any fixed object will always have a constant phase with respect to the reference oscillation since the distance to the fixed object is constant. For a similar reason signals from moving objects will have a variable phase with respect to the reference oscillation because the distance between the antenna and the moving objects is constantly changing. The combination of the reference oscillation and echo signals from fixed targets will result in signals of constant amplitude and the combination of the reference oscillation and echo signals from moving objects will result in signals having a cyclic variation in amplitude. All the signals are then amplified and detected in the normal fashion. Before the signals are applied to the system indicator they are passed through a comparator circuit that eliminates signals of constant amplitude while allowing signals of varying amplitude to pass.

Comparator circuits heretofore used have employed delay lines or mosaic storage tubes and normally operated on the individual signals. Certain disadvantages, such as the necessity of using special precision circuit elements are encountered in the employment of existing comparator circuits that may be obviated by use of the present invention.

It is an object of this invention, therefore, to provide a novel comparator circuit.

It is a further object of this invention to provide a comparator circuit in which conventional capacitors may be employed as storage elements, thus eliminating the need for delay lines or mosaic tubes.

A still further object of this invention is to provide a comparator circuit operating on a section of the radar range rather than on individual pulses.

For a better understanding of the invention together with other and further objects thereof reference is had to the following description taken in connection with the accompanying drawing in which:

Fig. 1 is a schematic drawing in block form of the present invention and;

Fig. 2 is a schematic drawing of one operating element of the invention.

In Fig. 1 video signals from the system receiver are applied to three integrator circuits 10, 11, and 12 by means of an input connection 13. These video signals are usually termed coherent video signals since the characteristics of the amplitudes of the various signals indicate whether the object that caused the signal is fixed or moving. Integrating capacitors 14, 15, and 16 and discharger circuits 18, 19 and 20 are electrically connected to integrator circuits 10, 11 and 12, respectively. The integrator circuits may be any of the circuits well known in the art and will, upon receipt of a control signal, place a charge on one of the integrating capacitors that is substantially proportional to the voltage-time integral of the video signals applied thereto. The discharger circuits may be any of the circuits well known in the art that will discharge the integrating capacitors upon the receipt of a control signal. A series of trigger generators 24, 25, 26, 27, 28, 29, 30 and 31 are connected in a series combination so that as each generator turns itself off the next in the series is turned on. The first generator in the series, generator 24, is turned on by a trigger pulse or initiating voltage signal applied by way of an input connection 33. Every third trigger generator starting with generator 24 is electrically connected to integrator 10 and discharger 19, every third generator starting with generator 25 is electrically connected to integrator 11 and discharger 20, and every third generator starting with generator 26 is electrically connected to integrator 12 and discharger 18. It should be understood that there may be more or fewer generators in the series than are shown in Fig. 1. The number of generators in the series will depend on the application of this invention.

Clamp circuits 35, 36, 37, 38, 39, 40 and 41 are electrically associated with storage capacitors 45, 46, 47, 48, 49, 50 and 51 respectively. The clamp circuits may be any of the circuits known in the art that will transfer the charge on the integrating capacitor to a storage capacitor or place a charge on the storage capacitor equal to the charge on the integrating capacitor. Again the number of clamp circuits and storage capacitors will depend upon the particular application of the invention but the number of clamp circuits and storage capacitors in general will be one less than the number of trigger generators. Trigger generators 25, 26, 27, 28, 29, 30 and 31 are electrically connected to clamp circuits 35, 36, 37, 38, 39, 40 and 41, respectively.

Every third clamp circuit starting with circuit 35 is connected to integrating capacitor 14, every third clamp circuit starting with clamp circuit 36 is connected with integrating capacitor 15 and every third clamp circuit starting with clamp circuit 37 is connected to integrating capacitor 16. A storage capacitor and the associated clamp circuit and trigger generator may be considered as a single storage unit.

One terminal of each of the storage capacitors are connected in common and connected through a resistor 55 to ground. An output connection 56 connected to the ungrounded end of resistor 55 provides means for connecting the output thereacross to indicator 57.

Fig. 2 of the drawing illustrates one operating unit of the circuit shown in Fig. 1. Integrator circuit 60, Fig. 2, corresponds to any of the integrator circuits shown in Fig. 1. Discharger circuit 61, clamping circuit 62, integrating capacitor 63, storage capacitor 64, and trigger generators 65, 66 and 67 correspond to similar elements in Fig. 1 and are similarly connected. Input connections 70 and 71 correspond to input connections 13 and 33, Fig. 1, and output connection 72 corresponds to output connection 56, Fig. 1. Resistor 73 in Fig. 2 corresponds to resistor 55 in Fig. 1 and the indicator 74 corresponds to indicator 57 of Fig. 1.

The operation of the invention is as follows:

Video signals are applied at input terminal 13, Fig. 1, from the system receiver (not shown). An initiating trigger is applied to trigger generator 24 by way of input connection 33 at the time the exploratory pulse is transmitted by the system or at such other fixed time as may be selected.

Trigger generator 24 supplies a signal of a predetermined time duration to integrator 10 which causes this circuit to apply to integrating capacitor 14 a charge that is proportional to the voltage-time integral of the video signals occurring while integrator 10 is operative.

The time that integrator 10 is operative is usually a fraction of the maximum range of the system. In this example it may be assumed that integrator 10 is operative for one ninth of the maximum range of the system. At the end of the time interval representing one-ninth of the range of the system, generator 24 returns to its initial operating state. At the time generator 24 returns to its initial state a signal is applied to trigger generator 25 to cause this circuit to become operative. Generator 25 now supplies a signal to integrator 11 that causes this circuit to place on capacitor 15 a charge equal to the integral of all video signals received while generator 25 is operative. Usually, although not necessarily, the time interval that generator 25 and the other trigger generators in the series are operative will be substantially equal to the time interval that generator 24 is operative.

Trigger generator 25 also supplies a signal to clamp circuit 35, thereby causing circuit 35 to place a charge on capacitor 45 that is equal or proportional to the charge stored on capacitor 14. At the end of the predetermined time interval generator 25 returns to its initial state and generator 26 is rendered operative. The signal from generator 26 is applied to integrator 12 to cause a charge to be placed on capacitor 16 that is proportional to the integral of the video signals occurring during the time generator 26 is operative. Clamp circuit 36 is also rendered operative by a signal from generator 26 and circuit 36 places a charge on capacitor 46 that is equal or proportional to the charge on capacitor 15. The signal from generator 26 applied to discharger 18 causes the charge on capacitor 14 to be removed.

When, in turn, generator 27 is made operative integrator 10 again causes a signal to be placed on capacitor 14 that is proportional to the integral of the video signals occurring in the fourth section in range of the system. At the same time the charge on capacitor 16 is transferred to capacitor 47 and capacitor 15 is discharged. In the next section of time or range, that is when generator 28 is operative, capacitor 15 is again charged, the charge on capacitor 14 is transferred to capacitor 48 and capacitor 16 is discharged. This cycle is repeated as many times as there are sections in range to be integrated. It can be seen from the foregoing that any one integrator, integrating capacitor or discharger is operative for every third section in range but that a separate trigger generator, clamp circuit and storage capacitor is provided for each section of the range. It should be remembered, however, that the video signals represented by the stored charges thus far described resulted from the reflection of a single exploratory pulse from all objects both fixed and moving that lie within the beam of the antenna.

After all the trigger generators in the series have operated the circuit is returned to its initial state except for the charges on the storage capacitors. The next exploratory pulse is now transmitted by the system and trigger generator 24 is again made operative. Echoes in the first section in range produce video signals that cause a charge to be placed on capacitor 14 in the manner described above. The charge placed on capacitor 14 during the first section in range after the second exploratory pulse will be the same as the charge placed on this capacitor in the first section in range after the first exploratory pulse only if there are no moving objects in this section in range. If moving objects are present in the first section in range the change in amplitude of the video signals representing these targets will cause the charge placed on capacitor 14 to be different from that originally placed thereon. If an object moves away from the system the signal representing this oject may move from the first to the second section in range and this, too, will cause a change in the charge placed on capacitor 14.

In the second section in range when capacitor 15 is being charged as a result of video signals in the second section in range the charge on capacitor 45 is being altered to correspond to the charge now existing on capacitor 14. It should be understood at this point that, after the first exploratory pulse, the charge placed on capacitor 45 and the other storage capacitors is not equal to the charge on the integrating capacitor but rather the charge placed on or removed from the storage capacitor is just that amount necessary to adjust the charge on the storage capacitor to the new value of charge on the integrating capacitor.

Assuming for the moment that the charge on capacitor 14 for the second exploratory pulse is greater than the charge for the first exploratory pulse, an incremental charge must now be added to capacitor 45. This charge must be added through resistor 55, and therefore a signal will appear across resistor 55 that is proportional to the change in charge on capacitor 45. In a similar manner the charges on all the storage capacitors are adjusted to new values corresponding to the video signals resulting from the reflection of the second exploratory pulse. This readjustment in stored charge is repeated for each succeeding exploratory pulse. The signals appearing across resistor 55 are applied to a suitable indicator, for example, an oscilloscope having a "Type A" presentation to provide a visual indication of the signals appearing across resistor 55. In the type A oscilloscope indicator the beam of a cathode ray tube is swept linearly across the face of the tube and any signals to be displayed cause a deflection of the beam at right angles to this sweep or time base. The output from the circuit shown in Fig. 1 will cause only one indication to appear for each section of range and then only if there are moving targets in that section of range. This type of display makes it much easier for the operator to locate moving targets than would be the case in a normal type A oscilloscope. In systems employing auxiliary indicators to display to an expanded scale sections in range of the total range of the system this invention might conveniently be employed as a master indicator to indicate what sections in range, if any, include moving targets and therefore which sections should be assigned normal radar indicators or other types of sectional moving target indicators.

The circuit shown in Fig. 2 represents one operating element in the circuit shown in Fig. 1. The video signals are applied to integrator 60 which is made operative by trigger generator 65. A charge proportional to the voltage-time integral of the applied video signals is applied to capacitor 63. After a predetermined time generator 65 returns to its normal state and generator 66 becomes operative. Clamp circuit 62 places a charge on capacitor 64 equal to the charge on capacitor 63. Trigger generator 66 returns to its normal state and generator 67 becomes operative and discharger 61 removes the charge on capacitor 63. Trigger generator 67 then returns to its normal state and the cycle is repeated for the next exploratory pulse. Signals indicating the presence of moving targets appear across resistor 73 and are applied to indicator 74 by way of the connection labeled "video out."

The unit shown in Fig. 2 may be used where it is not desirable to break the maximum range of the system into sections. Generator 65 may be made operative for a period of time corresponding to the maximum range to be covered by the system and generators 66 and 67 may be made operative for a much shorter period of time.

It should be evident that the operation of the circuit of Fig. 2 is exactly the same as the operation of the circuit of Fig. 1 and further the circuit shown in Fig. 2 may be considered to be identical to the circuit shown in Fig. 1 since it was stated that the number of clamp circuits, trigger generators, and storage capacitors in Fig. 1 is subject to variations depending upon the application of the invention.

Therefore, while there has been described what is at present considered the preferred embodiment of the invention it will be obvious to those skilled in the art that various changes and modifications may be made therein without departing from the invention.

What is claimed is:

1. A signal comparator circuit comprising first, second and third integrator circuits, means for applying signals to be compared to said three integrator circuits, first, second and third integrating capacitors electrically connected to said first, second and third integrator circuits respectively, first, second and third discharging means electrically connected to said first, second and third integrating capacitors respectively for discharging said capacitors, a series of at least three storage circuits each comprising a clamp circuit, a storage capacitor electrically connected thereto, and a trigger generator controlling said clamp circuit, each said trigger generator in said storage circuits being controlled by a signal from the trigger generator in the preceding storage circuit in the series, an initial trigger generator controlled by an external synchronizing signal, said initial trigger generator controlling the operation of the trigger generator in the first storage circuit in said series, means for connecting said initial trigger generator to said first integrator circuit and to said second discharging means, means for connecting said trigger generator in said first and each third succeeding storage circuit to said second integrator circuit and to said third discharging means, means for connecting the trigger generator in said second and each third succeeding storage circuit to said third integrator circuit and to said first discharging means, means for connecting said trigger generator in said third and each third succeeding storage circuits to said first integrator circuits and to said second discharging means, means for connecting one terminal of said storage capacitor in each of said storage circuits in common and through a resistor to ground, an indicator, and means for applying signals appearing across said resistor to said indicator.

2. A signal comparator circuit comprising a plurality of integrating circuits, means for applying signals to be compared to said integrating circuits, a plurality of integrating capacitors, a plurality of storage circuits, means for alternately charging said integrating capacitors through alternate integrating circuits, means for periodically causing said storage circuits individually to store a charge proportional to the charge on selected integrating capacitors, means for discharging each of said integrating capacitors individually after its charge has been stored on one of said storage circuits and means for indicating the change in charge in individual storage circuits and thereby indicating changes in the signals compared.

3. A comparator circuit for use in a moving object selecting radar system adapted to transmit exploratory pulses and receive echoes of said pulses from objects within a given range of said radar system; said comparator circuit including a plurality of electrical charge storage devices, means for separately integrating all the echo pulses received from objects in each of a plurality of portions of said range, means for selectively impressing on each of said storage devices the integrated pulses from one portion of said range, means for discharging said integrating means at least once in each interval between successive exploratory pulses, and means connected to all of said storage devices for indicating the variation of the charge on each of said storage devices during successive exploratory pulse intervals to thereby indicate the movement of an object from one portion of said range to another portion of said range.

4. The apparatus defined in claim 3, wherein each of said storage devices is a condenser.

5. A comparator circuit for use in a moving object selecting radar system adapted to transmit exploratory pulses and receive echoes of said pulses from objects within a given range of said radar system; said comparator circuit including a plurality of condensers, means including a plurality of integrating circuits for impressing the echo pulses from objects in each portion of said range on one of said condensers selectively, means for discharging each of said integrating circuits after its charge has been impressed on one of said condensers, and means for indicating the variation of the charge on each of said condensers during successive exploratory pulse intervals.

6. A comparator circuit for use in a radar system adapted to transmit exploratory pulses and receive echoes of said pulses from objects within a given range of said radar system; said comparator circuit including a plurality of electrical charge storage devices, means for separately integrating and impressing all the echo pulses from objects in each of a plurality of portions of said range on said storage devices selectively, and means including a cathode ray tube indicator connected to all of said storage devices for indicating the variation of the charge on each of said storage devices during successive exploratory pulse intervals.

7. The apparatus defined in claim 6, wherein said storage devices are condensers.

8. A comparator circuit for use in a moving object selecting radar system adapted to transmit exploratory pulses and receive echoes of said pulses; said comparator circuit including a plurality of storage condensers, means including a plurality of storage devices for separately integrating echo pulses from objects at given different distances from the radar system, means for impressing the integrated echo pulses on said storage condensers selectively with respect to distance, means for discharging each of said storage devices after its charge has been impressed on said condensers, and means including a cathode ray tube indicator connected to each of said condensers for indicating the variation of the charge on each of said storage condensers during successive exploratory pulse intervals.

PERSA R. BELL, Jr.
DAVID GALE.

REFERENCES CITED

The following references are of record in the file of this patent:

UNITED STATES PATENTS

| Number | Name | Date |
| --- | --- | --- |
| 2,176,742 | La Pierre | Oct. 17, 1939 |
| 2,415,981 | Wolff | Feb. 18, 1947 |
| 2,437,173 | Rutherford | Mar. 2, 1948 |
| 2,491,450 | Holmes | Dec. 13, 1949 |
| 2,512,144 | Emslie | June 20, 1950 |